No. 690,656. Patented Jan. 7, 1902.
E. LASKER.
GAME DEVICE.
(Application filed June 5, 1901.)
(No Model.)

Witnesses
H. A. Williams.
Jas. B. Richmond.

Inventor
Emanuel Lasker
by
Augustus B. Stoughton, Attorney.

UNITED STATES PATENT OFFICE.

EMANUEL LASKER, OF MANCHESTER, ENGLAND.

GAME DEVICE.

SPECIFICATION forming part of Letters Patent No. 690,656, dated January 7, 1902.

Application filed June 5, 1901. Serial No. 63,268. (No model.)

*To all whom it may concern:*

Be it known that I, EMANUEL LASKER, a subject of the Emperor of Germany, and a resident of Manchester, England, have invented certain new and useful Improvements in Game Devices and the Like; and I do hereby declare the following to be a full, clear, and exact description of the same, such as will enable others skilled in the art to which it appertains to make and use the same.

The invention relates to devices for the exercise of mental skill, and more particularly to devices of this character in which a playing-surface is employed divided into squares of different or special values, over which devices, figures, or symbols are moved in respect to certain objective points.

The object of the invention is to provide a simple and entertaining system and means for teaching strategy in its more particular relation to military tactics or war, and, stated in general terms, it may be said to comprise two main parts—namely, a permanent playing-surface visible at all times to the players divided off into squares upon which is printed or otherwise illustrated a military map of certain territory or territories and having an "attack" and a "defense" consisting of figures, devices, or symbols representative of armed forces, which I shall hereinafter refer to as "spadas," and the other part, which I shall refer to as the "map," consisting of a facsimile of the permanent playing-surface, but by preference of much smaller size, so as to be concealed in the lap of the player and upon which is marked or traced the positions assumed by the defense, according as the attack advances or retreats.

The invention further consists in means or indicia for indicating a reverse or temporary reverse or disablement of a spada and a resumption or renewal of conflict thereby, all as will be presently described and claimed.

The nature, characteristic features, and scope of the invention will be more clearly understood by reference to the accompanying drawings, forming a part hereof, in which—

Figure 1:
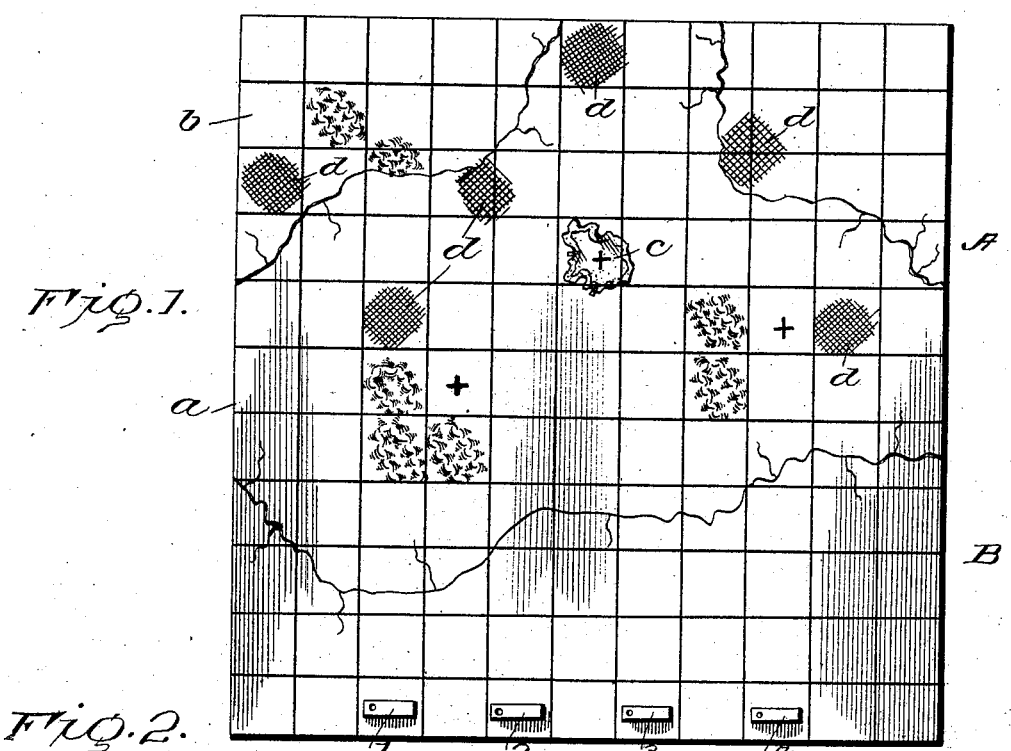
Figures 2, 3:
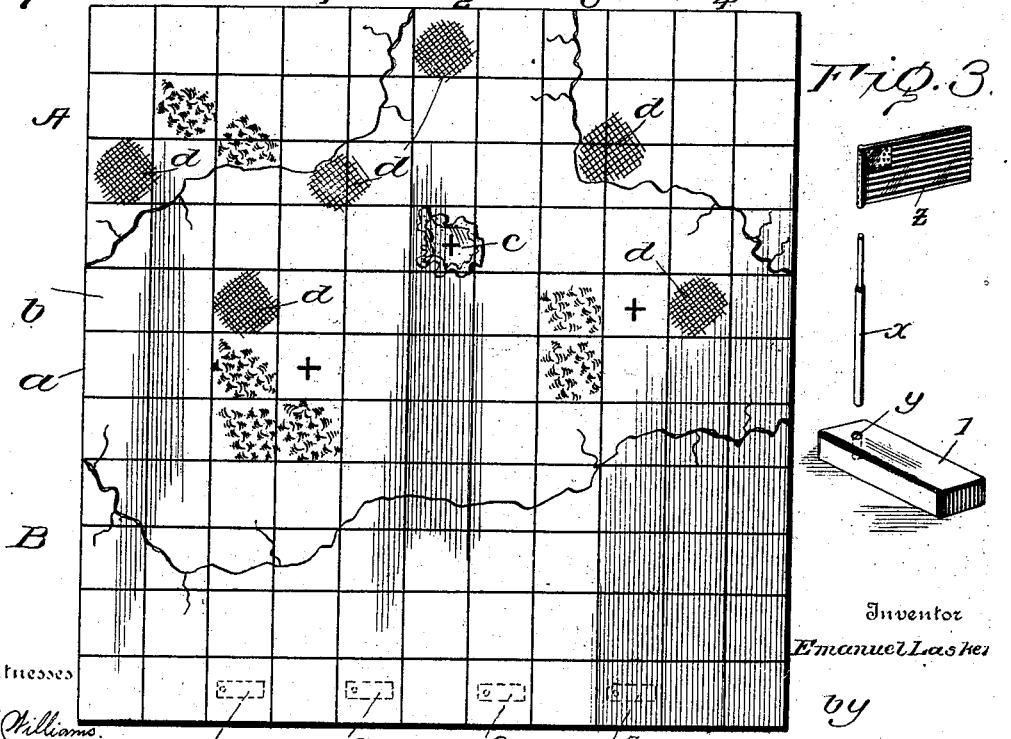

Figure 1 is a top view of the board or permanent playing-surface; Fig. 2, a similar view of its complemental map, which is here shown as of the same size for convenience of illustration; and Fig. 3 is a perspective view showing one of the spadas and its detachable parts.

Having reference to the drawings, $a$ represents a suitable playing-surface divided off into squares $b$, which may have printed or otherwise illustrated thereon certain natural obstructions to the passage of an army, such as rivers and mountains, which are illustrated in the drawings in the conventional mode. There may be also a fortress $c$ and towns or cities, as represented at $d$. The particular arrangement shown is not essential, and it will be understood that these features may be arranged in other ways, the present illustration being shown merely as an example and is only one instance of the many applications to which the invention is susceptible.

The board may be said to be divided into two sections A and B, the former representing the territory or ground normally occupied by the defense and the latter that occupied by the attack. The defense is shown diagrammatically by crosses as occupying the natural eminences or mountain-passes and the fortress $c$. The attack consists of devices, figures, or symbols designated, respectively, spadas 1 2 3 4. For convenience of illustration these are shown as ordinary blocks, which are by preference considerably longer than broad, the long side representing the front and the short side the flank. Each spada is provided with a detachable flagstaff $x$, which is inserted into a socket $y$, and has a removable flag $z$, for a purpose presently explained.

As already stated, the map, Fig. 2, is a replica of the "board," except that it is of considerably-less size, and this map-surface is made of material capable of receiving markings or to be traced with a pencil.

The initial positions of the spadas of defense and attack are represented, respectively, by crosses and by pieces designated 1 2 3 4. The spadas of defense are similar to those of the attack; but one set will suffice to explain the system.

In the present application of the invention the following code of rules might be suggested:

First. The game is played by two persons, (or parties,) who are styled the "defense"

and the "attack," the defense being made up of three pieces or spadas and the attack comprising four spadas. The various moves of the spadas are intended to simulate the movements of an army.

Second. It is the object of the attack to occupy four of the six towns within twenty-five moves or plays, each play representing a period of one day. When this is accomplished, the game is over. If, on the contrary, the attack has not succeeded in this time in occupying four of the six towns without losing its advantage in material superiority, the defense will have scored.

Third. The attack may on each "day" move as many of its spadas as it sees fit. The defense proceeds similarly by indicating on the map with a pencil the line of march of each of its spadas, the board being visible to both players, while the map is reserved to the defense.

Fourth. If one of the spadas of the defense is not more than two sections distant from the section occupied by a spada of the attack, the defense must indicate the position of its spada on the board.

Fifth. The spada may move in any direction backward and forward, except in the direction of its flank. Its front is always pointed in the direction of the line of march it has executed.

Sixth. Two spadas of the same party must not occupy the same square.

Seventh. If a hostile spada marches on the square occupied by an opponent, it "engages" the same and a combat ensues. A spada which voluntarily retires from the conflict is defeated. In sign thereof a flagpole $x$ with a flag $z$ is passed through it. A spada is obliged to retreat if a hostile spada not engaged in a combat enters a square adjoining that whereon the combat is taking place. A spada must retire when a hostile spada comes from a square onto which the former could not move—for instance, if assailed in its flank. On the day of the retreat of the defeated spada the victorious spada must remain in its position.

Eighth. A defeated spada may move according to rule 2, but cannot engage in a second combat before having had two days of rest. After the first day the flag is removed from the flagstaff and after the second day the flagstaff is removed from the spada, which is then restored to its initial value. A defeated spada which cannot avoid being engaged is taken from the board.

Ninth. The rivers divide all squares through which they pass into two parts. Each part, for the purpose of the above rules, counts as a square. A spada can only cross a river by passing from one half of the divided square to the other half of it, but is not permitted to do so if the latter half is occupied by a hostile spada. The fortress is square, which the attack is not permitted to enter.

Tenth. On difficult ground a spada engaged by a hostile spada may retreat without the penalty mentioned under rule 7 being enforced.

The spadas of the attack and the defense will of course be provided with some mark or color to distinguish them from each other.

It will be obvious to those skilled in the art to which the invention appertains that modifications may be made in details without departing from the spirit and scope of the same. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. Apparatus for teaching strategy, comprising a main board or playing-surface, devices to be moved over said playing-surface, and an auxiliary board or map constructed and adapted to receive a graphic record of countermoves, and having the same design as the main board, substantially as described.

2. Apparatus for teaching strategy, comprising a main board or playing-surface having objective points toward which figures, devices or symbols are moved by one opponent, and an auxiliary board or map upon which countermoves are marked or traced by another opponent, said auxiliary board having the same design as the main board.

In testimony whereof I have hereunto signed my name.

EMANUEL LASKER.

In presence of—
 JAS. A. RICHMOND,
 WALTER A. WILLIAMS.